(12) United States Patent
Gupta et al.

(10) Patent No.: US 10,824,239 B1
(45) Date of Patent: Nov. 3, 2020

(54) PROJECTING AND RECEIVING INPUT FROM ONE OR MORE INPUT INTERFACES ATTACHED TO A DISPLAY DEVICE

(71) Applicant: Dell Products L. P., Round Rock, TX (US)

(72) Inventors: Shubham Gupta, Jaipur (IN); Hithesh Sekhar Bathala, Chennai (IN)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 16/425,182

(22) Filed: May 29, 2019

(51) Int. Cl.
*G06F 3/01* (2006.01)
*G06F 3/042* (2006.01)
*G06F 3/023* (2006.01)
*G06F 3/0488* (2013.01)

(52) U.S. Cl.
CPC ............ *G06F 3/017* (2013.01); *G06F 3/0237* (2013.01); *G06F 3/0425* (2013.01); *G06F 3/0426* (2013.01); *G06F 3/04883* (2013.01)

(58) Field of Classification Search
CPC .... G06F 3/017; G06F 3/04883; G06F 3/0237; G06F 3/0426; G06F 3/0425; G06K 9/00375; G06T 7/20
See application file for complete search history.

(56) References Cited

U.S. PATENT DOCUMENTS

| 7,289,315 | B2 * | 10/2007 | Hillman | F16M 11/10 |
| | | | | 248/280.11 |
| 7,898,522 | B2 * | 3/2011 | Hildreth | G06T 7/593 |
| | | | | 345/156 |
| 8,553,934 | B2 * | 10/2013 | Adermann | G06T 7/20 |
| | | | | 382/103 |
| 9,134,798 | B2 * | 9/2015 | Morris | H04L 67/42 |
| 9,704,361 | B1 * | 7/2017 | Hazlewood | G08B 21/22 |
| 9,804,733 | B2 * | 10/2017 | Walline | G06F 3/04812 |
| 9,830,831 | B2 * | 11/2017 | Shen | G09B 5/14 |
| 9,870,773 | B2 * | 1/2018 | German | G06K 9/00671 |
| 10,228,848 | B2 * | 3/2019 | Walline | G06F 3/03545 |
| 10,261,685 | B2 * | 4/2019 | Deselaers | G06N 20/00 |
| 10,306,174 | B1 * | 5/2019 | Grafton | H04N 5/4403 |
| 10,551,930 | B2 * | 2/2020 | Wilson | G06F 3/011 |
| 2006/0176655 | A1 * | 8/2006 | Hillman | F16M 11/2078 |
| | | | | 361/679.06 |

(Continued)

*Primary Examiner* — Michael J Jansen, II
(74) *Attorney, Agent, or Firm* — Campbell Stephenson LLP; Shiv S. Naimpally (57) ABSTRACT

Multiple projection input devices may be permanently attached or temporarily attached to a display device. Each projection input device may project, using one or more projectors, a representation of an input device on a work surface, receive video data from one or more cameras, identify one or more fingers interacting with the representation of the input device, track a motion of the one or more fingers relative to the representation of the input device, predict, using a machine learning algorithm and based on tracking the motion of the one or more fingers relative to the representation of the input device, a particular input being provided, and transmit the particular input to a computing device. The representation of the particular input device may include a representation of one of: a keyboard, a mouse, a trackpad, a numeric keypad, a trackball, or a gaming controller.

20 Claims, 5 Drawing Sheets

(56) References Cited

U.S. PATENT DOCUMENTS

| | | | | |
|---|---|---|---|---|
| 2008/0030460 | A1* | 2/2008 | Hildreth | G06T 7/593 345/156 |
| 2010/0149090 | A1* | 6/2010 | Morris | H04L 67/42 345/156 |
| 2012/0081294 | A1* | 4/2012 | Dinh | G06F 3/04883 345/169 |
| 2012/0146902 | A1* | 6/2012 | Adermann | G06T 7/20 345/158 |
| 2012/0171656 | A1* | 7/2012 | Shen | G09B 5/14 434/365 |
| 2012/0268878 | A1* | 10/2012 | Smith | G06F 1/1613 361/679.08 |
| 2015/0325940 | A1* | 11/2015 | Foseide | G06F 21/88 439/304 |
| 2016/0116995 | A1* | 4/2016 | Wilson | G06F 3/013 345/157 |
| 2016/0132532 | A1* | 5/2016 | German | G06F 16/5854 382/103 |
| 2016/0196060 | A1* | 7/2016 | Walline | G06F 3/04845 715/773 |
| 2016/0313890 | A1* | 10/2016 | Walline | G06F 3/011 |
| 2017/0277428 | A1* | 9/2017 | Murayama | G06F 3/0425 |
| 2018/0121080 | A1* | 5/2018 | Coonahan | G16H 40/63 |
| 2018/0188938 | A1* | 7/2018 | Deselaers | G06F 3/04883 |

\* cited by examiner

PROJECTING AND RECEIVING INPUT FROM ONE OR MORE INPUT INTERFACES ATTACHED TO A DISPLAY DEVICE

BACKGROUND OF THE INVENTION

Field of the Invention

This invention relates to projection-based input interfaces and more particular to a plurality of projection-based input interfaces that are embedded in or attached to a bezel of a monitor (e.g., a display device).

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (e.g., a computing device) may receive input using one or more input devices connected to the computing device, such as a keyboard, a mouse (or trackball), or the like. With the proliferation of large monitors (e.g., 27", 32", 43" and wider), multiple users may use a single large monitor to collaborate on a project. However, with a single keyboard and a single mouse connected to the computing device, the multiple users may share the keyboard and mouse by passing them back and forth. However, such a process may stifle the creative process as a user who desires to contribute to the project may request the keyboard and/or mouse from another user and then wait to receive the keyboard and/or mouse to provide input. While waiting, the user may get distracted (e.g., by what the other user is presenting) and forgot what the user intended to contribute.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, multiple projection input devices may be permanently or temporarily attached to a display device. Each projection input device may project, using one or more projectors, a representation of an input device on a work surface, receive video data from one or more cameras, identify one or more fingers interacting with the representation of the input device, track a motion of the one or more fingers relative to the representation of the input device, predict, using a machine learning algorithm and based on tracking the motion of the one or more fingers relative to the representation of the input device, a particular input being provided, and transmit the particular input to a computing device. The representation of the particular input device may include a representation of a keyboard, a mouse, a trackpad, a numeric keypad, a trackball, or a gaming controller.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein illustrate how a display device (e.g., a monitor) may use projection input devices (PIDs) to project and receive input from multiple input devices, enabling multiple users to collaborate using a single display device (e.g., 27" diagonal or larger). In some cases, the display device may be connected to a computing device while in other cases a motherboard (e.g., with a central processing unit (CPU), memory, and other components) may be located in the same enclosure as the display device (e.g., behind a display panel) to create an "all-in-one" device.

The PIDs may be built-in to the enclosure of the display device or may be plug-in devices that can be attached to (or removed from) the enclosure of the display device. For example, a display device typically provides controls to turn power on and off, adjust brightness, adjust contrast, center the displayed image, and the like. For a display device with built-in PIDs, a user may use the controls to select the PIDs, causing the PIDs to emerge from a bottom of the enclosure. To illustrate, when not in use, the PIDs may retract (e.g., using a motor or other mechanism) into the bottom of the enclosure of the display device. When the user selects, using the controls, to use the PIDs, the PIDs may descend from the bottom of the enclosure. In this way, when the PIDs are not being used, the display device appears aesthetically pleasing because the PIDs are retracted into the enclosure. As another example, a display device may include multiple ports along the bottom of the enclosure. A plug-in PID may be connected to the display device by inserting a plug of the PID into one of the multiple ports. The plug may include a locking mechanism to temporarily hold (e.g., lock) the PID in place and a release mechanism to enable the PID that is temporarily locked in place, to be removed from the port. The plug may include electrical connections to enable the communication between the components of the PID and the computing device to which the display device is connected.

Each PID may include a proximity/motion sensor to detect motion from a user's hands. Each PID may include at least two projectors to project one or more two-dimensional (or three-dimensional) input devices, such as, for example, a keyboard (e.g., QWERTY-based keyboard or the like), a mouse, a trackball, or another type of input device. Each PID may include two or more cameras to capture video data that includes a user's hands interacting with the one or more input devices. The PID may include software modules trained using machine learning to analyze video data to detect gestures, predict key presses, predict mouse movements, predict mouse button presses, and the like. For example, the PID may recognize a first gesture as an instruction to project a keyboard, recognize a second gesture as an instruction to project a mouse, and so on, with each particular gesture used to instruct the PID to display a particular type of input device. In addition, the PID may recognize a particular gesture as indicating to stop projecting a particular one of the input devices. The PID may perform hand tracking, finger tracking, finger pad tracking, key input prediction, mouse input prediction, or any combination thereof.

The PID may include one or more motors (or another similar mechanism) to move the PID to track the hands of a user and position the projection of one or more input devices based on the location of the user's hands. For example, the motors of the PID may control the projection of one more input devices in three-dimensional (3D) space, enabling the PID to be adjusted along the x-axis, y-axis, and z-axis (e.g., roll, pitch, and yaw). The cameras tracking the user's hands and fingers may continually provide feedback to the motors to enable the motors to adjust the PID to accurately position the input devices according to the user's hand and finger positions.

The PID may enable each user to individually adjust a color and a brightness of each input device. In some cases, each user may use gestures to select a particular color and adjust a brightness level of each input device associated with the user. In other cases, each user may use each PID's controls to select a particular color and adjust a brightness level of each input device associated with the user. For example, a first user may select a red keyboard, a second user may select a blue keyboard, a third user may select a white keyboard, and so on. The PID may include an ambient light sensor (ALS) that determines an amount of ambient light falling on the PID. Based on the ambient light, the PID may automatically adjust a brightness of the projected input devices (e.g., keyboard, mouse, and the like) based on a current ambient light level.

Thus, a display device may include multiple PIDs or may enable multiple PIDs to be attached (e.g., connected) to the display device. Each PID may project one or more input devices, thereby enabling multiple users to collaborate on a project. Each user may have associated with the user one or more input devices to enable each user to provide input while each participating user views the display device. In this way, multiple users can substantially simultaneously provide input while the multiple users view a single display device, enabling a collaborative environment.

For example, a projection input device may include one or more cameras, one or more projectors, one or more processors, and one or more non-transitory computer-readable storage media to store instructions executable by the one or more processors to perform various operations. For example, the operations may include: projecting, using the one or more projectors, a representation of an input device on a work surface, receiving video data from the one or more cameras, identifying one or more fingers interacting with the representation of the input device, tracking a motion of the one or more fingers relative to the representation of the input device, predicting, using a machine learning algorithm and based on tracking the motion of the one or more fingers relative to the representation of the input device, a particular input being provided, and transmitting the particular input to a computing device. The representation of the particular input device may include a representation of one of: (i) a keyboard, (ii) a mouse, (iii) a trackpad, (iv) a numeric keypad, (v) a trackball, or (vi) a gaming controller. The projection input device may be one of a plurality of projection input devices that are attached to an enclosure of a display device. The display device may be separate from but connected to the computing device or the computing device may be located in the same enclosure as the display device (e.g., an all-in-one device). The operations may include: receiving additional video data from the one or more cameras, performing a gesture recognition analysis of a content of the additional video data, determining, based on the gesture recognition analysis, that the additional video data includes a pre-defined gesture, and performing one or more actions associated with the pre-defined gesture. The pre-defined gesture may be provided by a manufacturer of the projection input device or defined by a user (e.g., a user-defined gesture). The one or more actions may include at least one of: (i) initiating projection of a representation of a particular input device, (ii) modifying an appearance of the representation of the particular input device (e.g., modifying at least one of a brightness or a color of the representation of the particular input device), (iii) moving the projection of the representation from a first location to a second location on the work surface, (iv) stopping displaying the representation of the particular input device, another action associated with the projection input device, or any combination thereof.

In some cases, one or more projection input device may be permanently attached to the enclosure of a display device. In such cases, when the projection input device is not in use, the projection input device may be stored in a retracted position in a cavity of the enclosure of the display device and when the projection input device is in use, the projection input device may be placed in a projection position in which at least a portion of the projection input device extends past an external surface of the enclosure of the display device. For example, after a user uses a control panel to select a particular projection input device to project a representation of an input device, the particular projection input device may emerge from the cavity and descend from a bottom of the enclosure to project the representation of the input device. After a user uses the control panel to indicate that the particular projection input device is not to be used, the particular projection input device may retract back into the cavity, thereby providing an aesthetically pleasing appearance of the display device, e.g., a user viewing the display device may not see the projection input devices that have retracted into their respective cavities.

In other cases, one or more of the projection input device may be temporarily attached to the enclosure of a display device by inserting a plug of the projection input device into a port located on the enclosure of the display device. The plug may include (i) a locking mechanism to temporarily secure the projection input device to the enclosure of the display device, (ii) a release mechanism to release the projection input device from the enclosure of the display device after the projection input device is secured to the enclosure of the display device, (iii) one or more motors to position the projection input device in three dimensions, and (iv) one or more electrical connections to route power from the display device to the projection input device. Of course, the display device may include a combination of zero or more (e.g., a first set of) projection input devices that are permanently attached to the display device and zero or more (e.g., a second set of) projection input devices that are temporarily attached to the display device.

Figure 1:
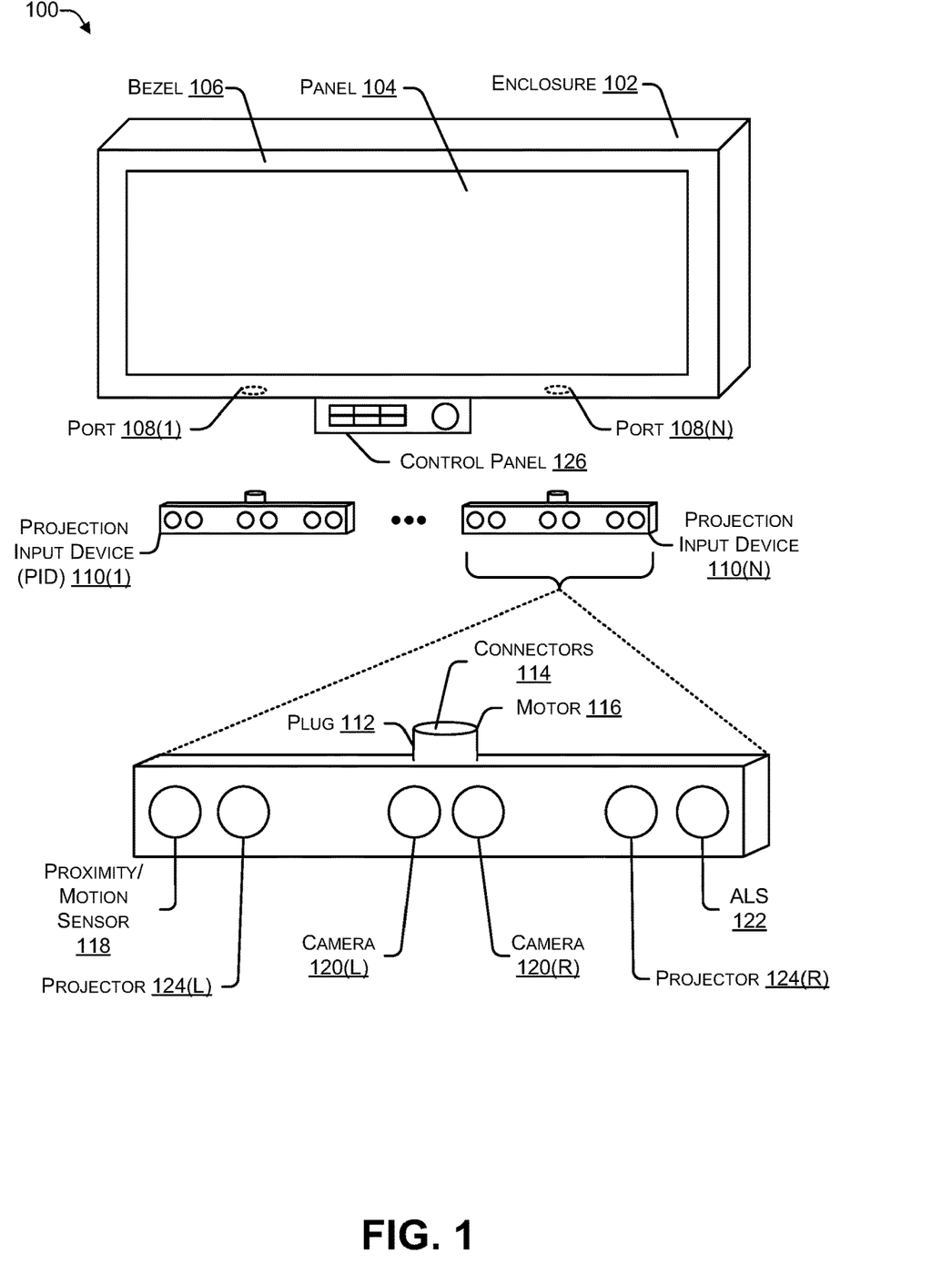
FIG. 1 is a block diagram illustrating a display device that includes a plurality of projection input devices, according to some embodiments.

FIG. 1 is a block diagram illustrating a display device 100 that includes a plurality of projection input devices, according to some embodiments. The display device 100 may include an enclosure 102, a display panel 102, and a bezel 106 surrounding outer edges of the display panel 102. The enclosure 102 may be made of metal, plastic, another type of material, or any combination thereof. The display panel 104 may display content (e.g., text, images, graphics, and the like) and may use one or more display technologies, such as light emitting diodes (LEDs), organic LED (OLED), or the like. In some cases, the display panel 104 may be responsive to touch input (e.g., referred to as touch sensitive).

In some cases, the display device 100 may include multiple ports 108(1) to 108(N) (where N>0) located along a bottom of the enclosure 102. In such cases, multiple projection input devices (PIDs) 110(1) to 110(N) may be attached to the corresponding ports 108(1) to 108(N). For example, the PID 110(1) may be attached to (and subsequently detached from) the port 108(1) and the PID 110(N) may be attached to (and subsequently detached from) the port 108(N). In this example, the display device 100 uses a modular architecture in which PIDs can be attached and detached depending on how many users desire to collaborate using the display device 100. For example, when two people (e.g., N=2) collaborate, two PIDs may be used; when three people (e.g., N=3) collaborate, three PIDs may be used; when four people (e.g., N=4) collaborate, four PIDs may be used, and so on. Of course, in some cases, two or more users may share a single PID.

Each of the PIDs 110 may have dimensions of between 2 to 10 centimeters (cm) in length, 1 to 4 cm in height, and 1 to 4 cm in depth. The number of ports 108 on the display device 100 may vary according to a size of the display device 100. For example, a 27" display device 100 may include between 2 to 4 ports 108, a 34" display device 100 may include between 4 to 8 ports 108, and so on.

In the example illustrated in FIG. 1, the display device 100 uses a modular architecture in which the PIDs 110 can be attached to and subsequently detached from the display device 100. However, in other cases, the PIDs 110 may be permanently attached to the display device 100. In such cases, the PIDs 110 may be activated or deactivated based on a number of participants in the collaborative process. For example, the display device 100 may have four PIDs 110 permanently attached to the display device 100 and two, three, or four users may enable two, three, or four PIDs 110, respectively. In still other cases, the display device 100 may come with M (where M>0) permanently attached PIDs and N ports 108 to modularly attach N PIDs 110. For example, the display device 100 may include two permanent PIDs and two ports 108 to attach an additional two PIDs for a total of four PIDs.

If one or more of the PIDs 110 are permanently attached to the display device 100, the PIDs 110, when not in use, may be stored in a bottom of the enclosure 102. In such an arrangement, a user may use controls in a control panel 126 of the display device 100 to activate one or more of the PIDs 110. In response to a user activating the PIDs 110 using the control panel 126, a motorized door in the bottom of the enclosure 102 may open and one or more of the PIDs 110 may descend via a motorized shaft to project one or more input devices. In this way, when not in use, the PIDs 110 are hidden from sight, such that the display device 100 is aesthetically pleasing. The control panel 126 may similarly be stored in the bottom of the enclosure 102 when not in use and may descend when a user touches a release mechanism. The user can touch a retraction mechanism to cause the control panel 126 to retract back into the bottom of the enclosure 102.

Each of the PIDs 110 may include multiple sensors and electrical connections connecting the sensors to a computing device via the display device 100. In some cases, the display device 100 may be a display device connected to a computing device that includes a motherboard having one or more processors, a memory, and other components. In other cases, the display device 100 may be an all-in-one device in which the enclosure 102 includes the display panel 104 and the motherboard.

The PID 110(N) may include a plug 112 that can be inserted into the port 108(N). The plug 112 may include a locking mechanism to temporarily attach the PID 110(N) to the enclosure 102 after the plug 112 has been inserted into the port 108(N) and a release mechanism to enable the PID 110(N) to be released from the port 108(N). The plug 112 may include one or more connectors (e.g., cables terminating in pins) to enable communication between the motherboard and the PID 110(N). The plug 112 may include at least one motor 116 to enable the PID 110(N) to move in three dimensions to enable a location of a projected input device to be adjusted based on a location of the user's hands (including fingers and fingertips).

The PID 110(N) may include various components (e.g., including sensors), such as, for example, a proximity/motion sensor 118, a camera 120(L) (L=left), a camera 120(R) (R=right) (e.g., optical sensors), an ambient light sensor (ALS) 122, a projector 124(L), and a projector 124(R). The proximity/motion sensor 118 may determine when a user is in proximity to the PID 110(N) and, when a user is detected, instruct the projectors 124 to project one or more representations of input devices (e.g., a keyboard, a mouse, and the like). The cameras 120 may identify and continually track a user's hands, fingers, and fingertips. Thus, as the user provides input while moving the user's fingers, the cameras 120 may continually (e.g., 15, 30, 60, 120 times per second or the like) determine a location of each finger and continually provide the data to the projectors 124. The ALS 122 may continually monitor an amount of ambient light and adjust the brightness of the one or more representations of input devices accordingly (e.g., less ambient light may cause the brightness to be decreased while more ambient light may cause the brightness to be increased). The projectors 124 may use lasers or other forms of 2D or 3D light projection (e.g., holographic projection) to project one or more representations of input devices, such as a keyboard, a mouse, a trackpad, a numeric keypad, a gaming controller, or another type of input device.

Thus, a display device may include multiple PIDs or may have multiple ports to which multiple PIDs may be attached. If the multiple PIDs are permanently attached to the display device, the PIDs may be stored in a recessed compartment in a bottom of an enclosure of the display device. A user may use a control panel to select one or more of the PIDs. In response to the selection, the PIDs may emerge from the bottom of the display device. Alternately, one or more of the PIDs may be temporarily attached to the display device by inserting a plug of each PID into a port located on the bottom of the enclosure of the display device. Each PID may determine a proximity of a particular user and determine, using video data provided by one or more cameras, a location of the user, a location of the user's hands, a location of each finger of the user, and a location of each fingertip of the user. Based on the location and motion of each fingertip, each PID may predict (e.g., using machine learning) an occurrence of a particular type of input (e.g., key press, button click, or the like) and send the predicted input (e.g., a particular key press, right mouse click, left mouse click or the like) to a computing device associated with the display device. The computing device may use the predicted input to modify content being displayed on the display device. For example, when a document is being edited, a predicted keypress may cause an associated alphanumeric character to be added and displayed. When interactive content, such as a game, is being displayed, a predicted keypress may cause a corresponding interaction with the content (e.g., firing a weapon, causing a game character to move, or the like).

A user may select a color and a brightness level for each representation of an input device to enable multiple users to distinguish their corresponding input device representations from the input device representations associated with other users. Each PID may continually track a user's hands, fingers, and fingertips using video data from the cameras and continually adjust the projectors to position the representations of the input devices (e.g., according to the user's posture, position, and the like). For example, each PID may include motors (or another type of mechanism) to enable each PID to be positioned in three dimensions to adjust a location of the projected input device(s) to provide an ergonomic input experience.

Thus, using a display device with multiple PIDs, multiple users can simultaneously (e.g., substantially at the same time) view and edit a particular document, write different sections of software code, play a multiplayer game, and the like. For example, in some cases, the display device may be configured as multiple virtual monitors (e.g., virtual display devices). In this example, the display device may display two (or four) quadrants, with each user working on a particular portion of the document in a particular quadrant. For example, a first user may write or edit a first section while a second user writes or edits a second section, and so on. In this way, multiple users can collaborate, including editing a single document, designing a single software module, laying a same game, or the like, while viewing the content being displayed by the display device.

Figure 2:
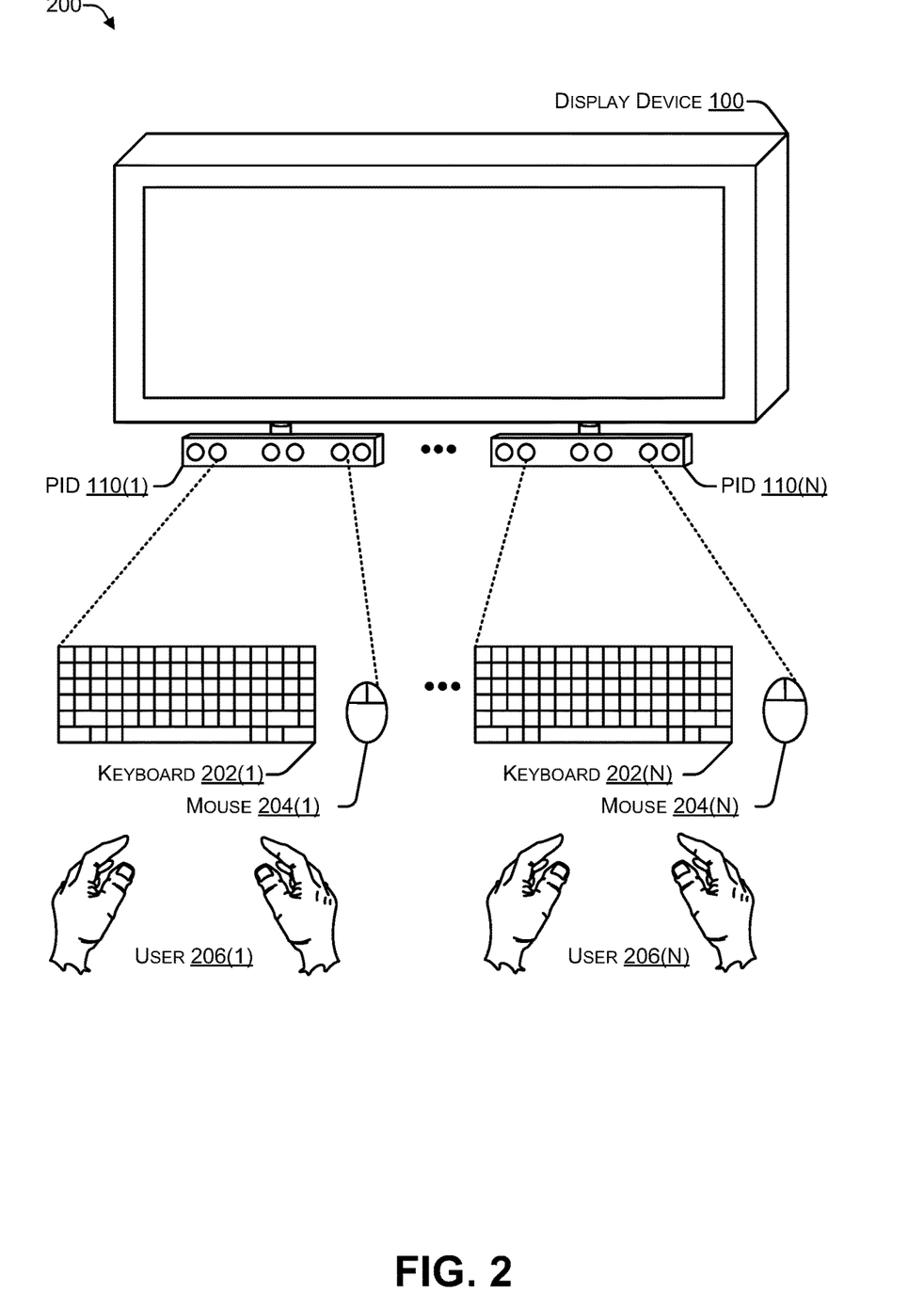
FIG. 2 is a block diagram illustrating a display device projecting a plurality of input devices, according to some embodiments.

FIG. 2 is a block diagram 200 illustrating a display device projecting a plurality of representations of input devices, according to some embodiments. When PIDs 110(1) to 110(N) are being used, each of the PIDs 110 may project one or more representations of input devices. For example, the PID 110(1) may project a keyboard 202(1) and a mouse 204(1) to enable a user 206(1) to provide input and the PID 110(N) may project a keyboard 202(N) and a mouse 204(N) to enable a user 206(N) to provide input. The keyboards 202 and the mice 204 are merely examples of representations of input devices that may be projected and it should be understood that other types of representations of input devices, such as, for example, a numeric keypad, a trackpad, a trackball, a gaming controller, or other types of input devices may be projected by the PIDs 110.

In some cases, each of the PIDs 110 may determine a type of representation of an input device to project based on recognizing a particular hand gesture. For example, when the user 206(N) places both hands flat on a work surface (e.g., a table) and raises and lowers them in a particular order (e.g., left hand is raised and lowered within a predetermined time interval, such as 500 milliseconds (ms) or less followed by the right hand being raised and lowered within the predetermined time interval), the PID 110(N) may recognize the gesture and display the keyboard 202(N). As another example, when the user 206(N) cups the right hand over the surface, the PID 110(N) may recognize the gesture and display the mouse 204(N). Each of the PIDs 110 may include predefined gestures associated with predefined input devices. In addition, the user may input a particular set (of one or more) gestures and associate the particular set of gestures with a particular input device (e.g., a gaming controller or other application-specific controller). Furthermore, the PIDs 110 may provide a user interface (UI) that enables a user to define a custom input device representation (e.g., including shortcut keys for common commands used in a particular software application) and associate a particular set of gestures that when recognized cause the custom input device representation to be projected. Thus, after one of the PIDs 110 recognizes the particular set of gestures, the PID may automatically display the associated input device representation. In this way, for example, a user who uses a video editing application can create a custom input device representation that include the most commonly used functions and commands for video editing.

Thus, each PID may project one or more representations of input devices. The representations of input devices may be pre-configured devices (e.g., a QWERTY-based keyboard, a mouse, or the like) or may be custom configured by a user (e.g., for a specific software application). In this way, each user can select and use a particular set of representations of input devices that each individual user prefers rather than sharing a common set of input devices among multiple users when collaborating.

Figure 3:
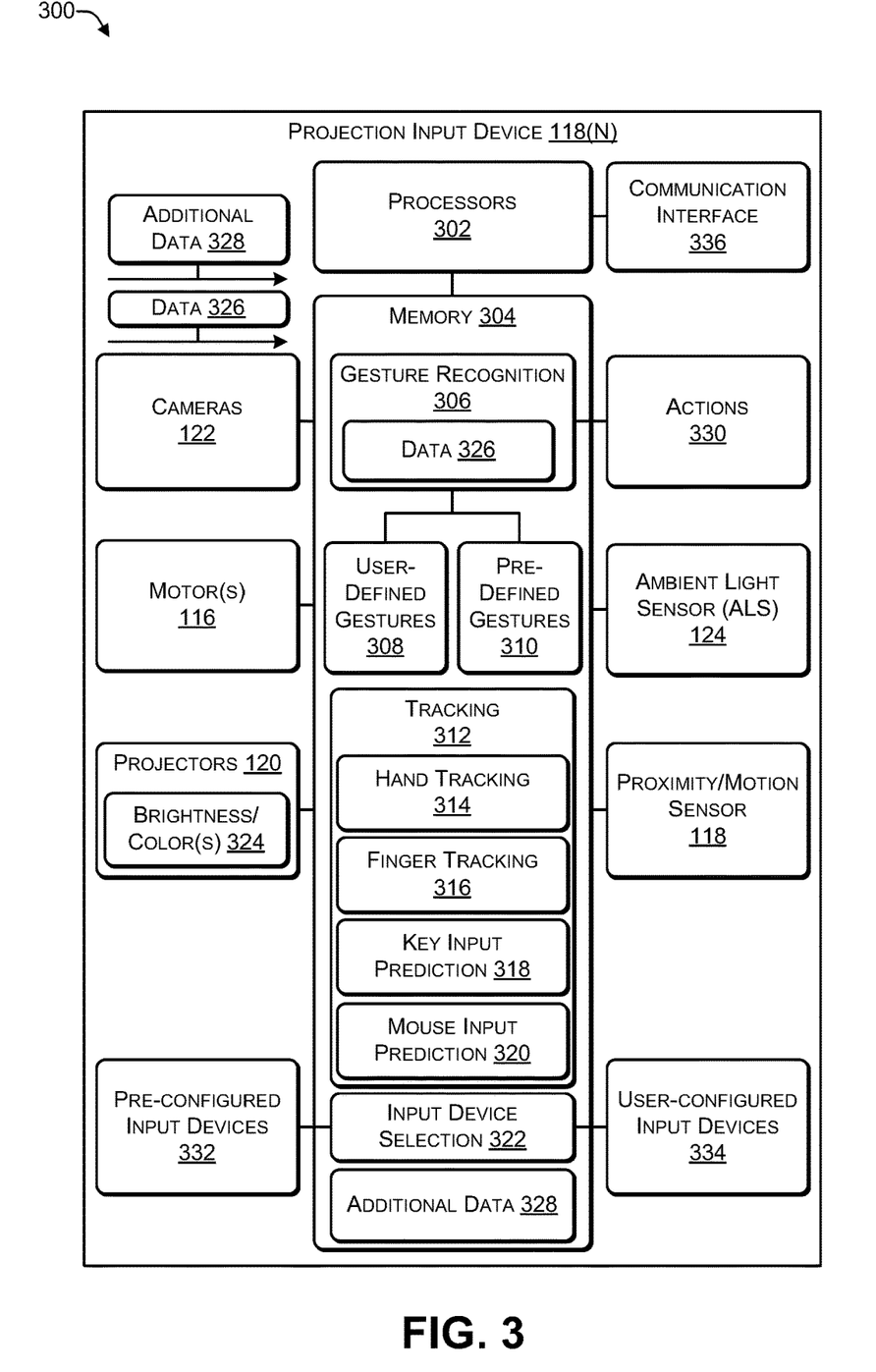
FIG. 3 is a block diagram of components of a projection input device, according to some embodiments.

FIG. 3 is a block diagram 300 illustrating components of a representative projection input device, according to some embodiments. The representative PID 110(N) may include the motors 116, the proximity/motion sensor 118, the projectors 120, the cameras 122, the ALS 124, one or more processors 302, and a memory 304 (e.g., non-transitory computer-readable storage media) to store instructions organized in the form of multiple software modules that are executable by the processors 302.

The memory 304 may include a gesture recognition module 306. For example, the gesture recognition module 306 may analyze data 326 received from the cameras 122 to determine whether the data 326 includes a gesture. For example, the gesture recognition module 306 may analyze (e.g., using machine learning) the data 326 to identify a gesture and determine whether the gesture matches (i) a used-defined gesture in a set of user-defined gestures 308 or (ii) a pre-defined gesture in a set of pre-defined gestures 310. In response to detecting one of either a user-defined gesture or a pre-defined gesture, the gesture recognition module 306 may identify an associated action from one or more actions 330 and send a message to the processors 302 to perform a particular action. For example, the particular action may include initiating display of a particular input device, modifying how a particular representation of an input device is displayed, stop displaying a particular representation of an input device, modifying a color or a brightness of a particular representation of an input device, another action related to a representation of an input device, and the like.

The memory 304 may include a tracking module 312 to track a user that is interacting with the PID 110(N). For example, the tracking module 312 may analyze (e.g., using machine learning) additional data 328 provided by the cameras 122 to perform hand tracking 314 (e.g., tracking one or both hands of a user) and finger tracking 316 (e.g., tracking up to 10 fingers, including fingertips, of each user). The tracking module 312 may (e.g., based on the finger tracking 316) perform key input prediction 318 to predict (e.g., using machine learning) which keys of a projected keyboard (e.g., the keyboard 202 of FIG. 2) are being selected. The tracking module 312 may (e.g., based on the finger tracking 316) perform mouse input prediction 320 to predict (e.g., using machine learning) which buttons of a projected mouse (e.g., the mouse 204 of FIG. 2) and which mouse movements are being performed. Of course, if another type of input device is being projected, the tracking module 312 may predict (using machine learning) the type of input being provided by the projected input device and transmit, using a communications interface 336, the predicted input to a computing device. The communications interface 336 may provide wired communications (e.g., universal serial bus (USB) or the like), wireless communications (e.g., Wi-Fi, Bluetooth, Near Field Communication (NFC), or the like), or both. The tracking module 312 may provide a projected input device selection/configuration interface 322 to enable a user to select a pre-configured input device representation (e.g., keyboard, mouse, numeric keypad, gaming controller, or the like) from pre-configured input devices 332 or to configure a custom input device representation from user-configured input devices 334 to suit the user's usage of a particular software application.

The projectors 120 may enable a user to specify a brightness level and a color 324 for each representation of an input device being projected by the projectors 120. The projectors 120 may modify the brightness according to ambient light data received from the ALS 124.

Thus, each PID may include various software modules. For example, a gesture recognition module may receive data from the cameras and determine if the data includes a gesture that matches either a user-defined gesture or a pre-defined gesture. If the PID recognizes the gesture, the PID may perform a corresponding set of (e.g., one or more) actions, such as, for example, starting or stopping display of a particular type of input device representation, changing from a first input device representation (e.g., standard keyboard) to a second input device representation (e.g., ergonomically laid out keyboard), changing a location where an input device representation is being projected, changing a color or brightness level of an input device representation that is being projected, modifying (e.g., increasing or decreasing) a size of an input device representation that is being projected, and other actions related to the input device representation. The PID may track a user's hands, fingers, and fingertips and predict, using machine learning, the type of input being provided, such as a keypress, a mouse button press, a mouse movement, and the like. In this way, the PID projects one or more input device representations, tracks the user's interactions with the projected input devices, predicts the type of input being provided based on the user's interactions, and transmits the predicted input to a computing device. From the perspective of the computing device, the PID is viewed as being similar to another input device (e.g., a physical keyboard, a physical mouse, or the like) that responds to user interaction by transmitting input data to the computing device.

Figure 4:
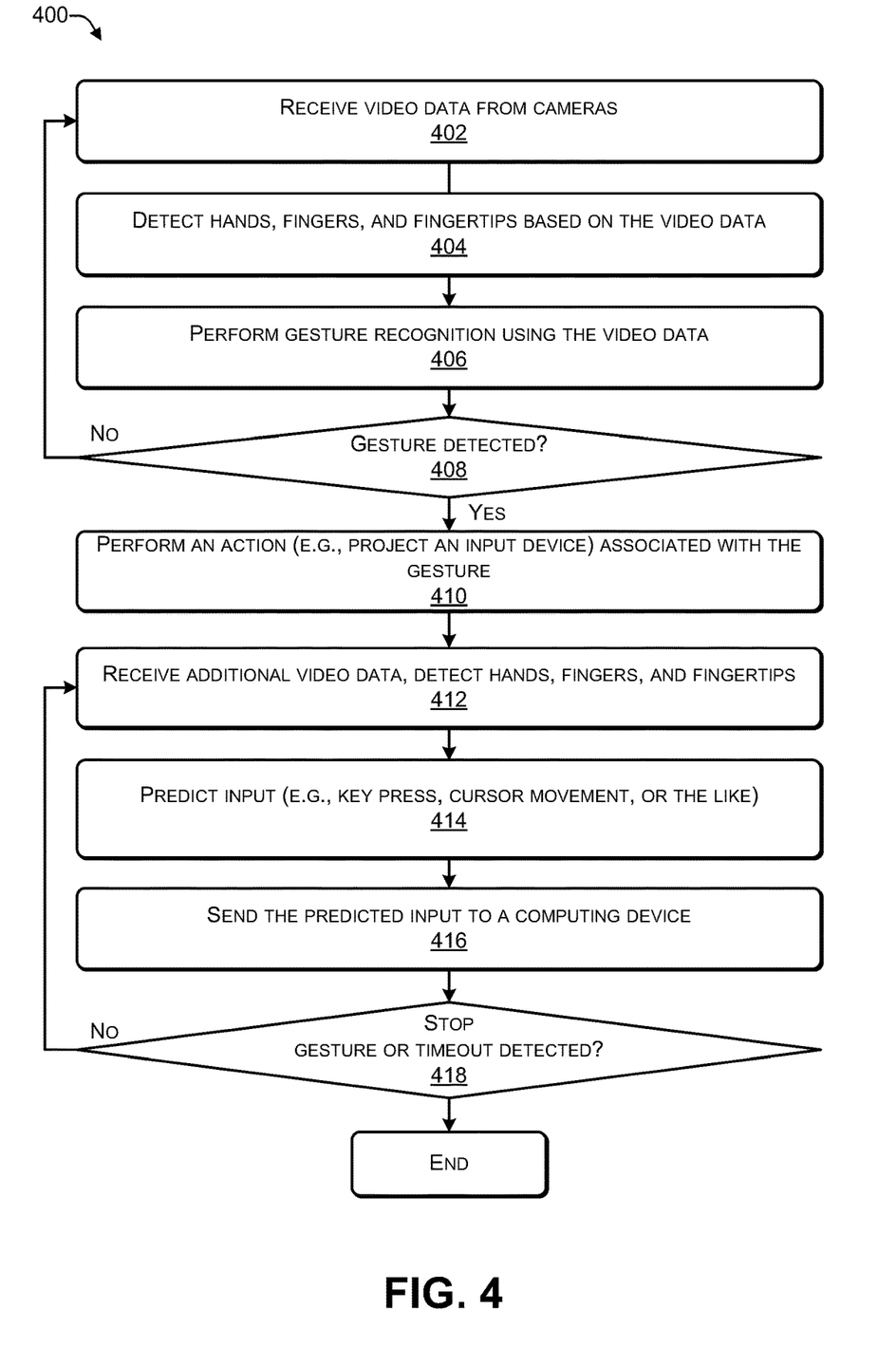
FIG. 4 is a flowchart of a process that includes projecting an input device after detecting a particular gesture, according to some embodiments.

In the flow diagram of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIGS. 1, 2, and 3 as described above, although other models, frameworks, systems and environments may be used to implement these processes.

FIG. 4 is a flowchart of a process 400 that includes projecting an input device representation after detecting a particular gesture, according to some embodiments. The process 400 may be performed by the PID 110(N) (where N>0) of FIGS. 1, 2, and 3.

At 402, the process may receive video data from one or more cameras. At 404, the process may detect hands, fingers, and fingertips based on the video data. At 406, the process may perform gesture recognition using the video data. At 408, the process may determine if the video data includes a gesture (e.g., a pre-defined gesture or a user-defined gesture). If the process determines, at 408, that "no" the video data does not include a recognizable gesture, then the process may proceed back to 402 to receive video data. If the process determines, at 408, that "yes" a gesture was detected in the video data (e.g., the video data includes a recognizable gesture), then the process may proceed to 410. At 410, the process may perform an action, such as, for example, projecting a particular input device representation, associated with the gesture. For example, in FIG. 3, the PID 110(N) may receive the data 326 from the cameras 122. The gesture recognition module 306 may detect hands, fingers, and fingertips in the video data. The gesture recognition module 306 may determine, using machine learning, if the data 326 includes a gesture that matches one of the user-defined gestures 308 or the pre-defined gestures 310. If the gesture recognition module 306 determines that the data 326 includes a gesture that matches one of the user-defined gestures 308 or the pre-defined gestures 310, then the gesture recognition module 306, then the PID 110(N) may perform one of the actions 330 that is associated with the gesture such as projecting the representations 202(N), 204 (N).

At 412, the process may receive additional video data (from the cameras) and detect the hands, fingers (including fingertips) of a user. At 414, the process may predict the input being provided using the projected input device based on the additional video data. At 416, the predicted input may be sent to a computing device (e.g., to which the PID is connected). At 418, the process may determine whether a stop gesture was detected or a timeout period (e.g., during which no user movement was detected) expired. If the process determines, at 418, that "no" a stop gesture was not detected and the timeout period did not expire, then the process may proceed to 412, where additional video may be received from the cameras. If the process determines, at 418, that "yes" either a stop gesture was detected or the timeout period (e.g., during which no user movement was detected) expired, then the process may end. For example, in FIG. 3, the tracking module 312 may receive the additional data 328 from the cameras and predict, based on the user's interactions with the projected input device, the type of input, such as a (predicted) key press, a (predicted) mouse button press, a (predicted) mouse movement, or the like. The PID 110(N) may send the predicted input, via the communications interface 336, to a computing device to which the PID 110(N) is connected. If the PID 110(N) determines that the user has performed a stop gesture (e.g., a gesture associated with an action to stop projecting one or more input devices), then the PID 110(N) may stop projecting the one or more input devices. If the PID 110(N) does not detect any hand or finger movements for more than a predetermined period of time (e.g., timeout period), then the PID 110(N) may stop projecting the one or more input devices. For example, if user movements are not detected within a continuous time period of X minutes (e.g., X=5, 10, or the like), then the PID 110(N) may stop projecting the one or more input devices. The PID 110(N) may include a default timeout period and the user may change the timeout period to a different amount of time.

Thus, a PID may receive data from cameras and determine if the data includes a gesture that matches either a user-defined gesture or a pre-defined gesture. If the gesture is recognized, the PID may perform a corresponding set of (e.g., one or more) actions, such as, for example, starting or stopping display of a particular type of input device representation, changing from a first input device representation (e.g., standard keyboard) to a second input device representation (e.g., ergonomically laid out keyboard), changing a location where an input device representation is being projected, changing a color or brightness level of an input device representation that is being projected, modifying (e.g., increasing or decreasing) a size of an input device representation that is being projected, and other actions related to the input device representation. The PID may track a user's hands, fingers, and fingertips and predict, using machine learning, the type of input being provided, such as a keypress, a mouse button press, a mouse movement, and the like. Thus, the PID projects one or more input device representations, tracks the user's interactions with the projected input devices, predicts the type of input being provided based on the user's interactions, and transmits the predicted input to a computing device. In this way, multiple users can collaborate using multiple projected input devices (projected by multiple PIDs) while viewing a single display device.

Figure 5:
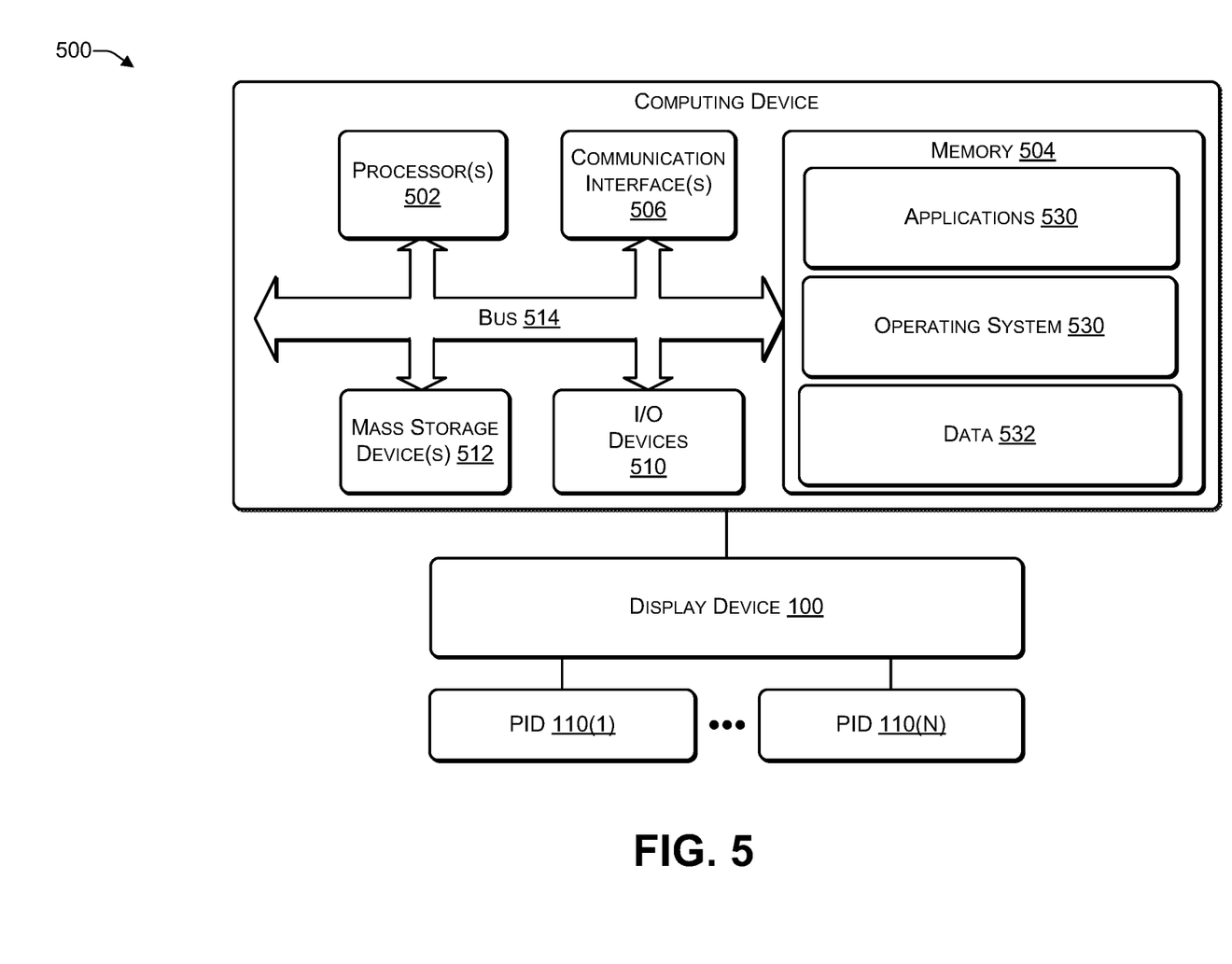
FIG. 5 illustrates an example configuration of a computing device that can be used to implement the systems and techniques described herein.

FIG. 5 illustrates an example configuration of a computing device 500 to receive input from the PIDs 118 associated with the display device 100. The computing device 500 may include one or more processors 502 (e.g., CPU, GPU, or the like), a memory 504, communication interfaces 506, other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data with other computing devices via a network. The communication interfaces 506 can facilitate communications within a wide variety of networks and protocol types, including wired networks (e.g., Ethernet, DOCSIS, DSL, Fiber, USB etc.)

and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The computing device 500 may be connected to the display device 100. The display device 100 may be used for displaying content (e.g., information and images) to users. Other I/O devices 510 may include devices to receive various inputs from a user and provide various outputs to the user, and may include a keyboard, a touchpad, a mouse, a printer, audio input/output devices, and so forth. The computer storage media, such as memory 504 and mass storage devices 512, may be used to store software and data, such as, for example, one or more applications 516 and data 518.

The computing device 500 may be integrated into the same enclosure as the display device 100 to create an all-in-one device or the computing device 500 may be in a separate enclosure from the display device 100. In the latter case, the computing device 500 may be connected to the display device 100 using a wired interface (e.g., high definition multimedia interface (HDMI) or the like) or a wireless interface (e.g., wireless HDMI or the like).

Thus, the PIDs 118 may be permanently or temporarily attached to the display device 100. Each PID may be used to project one or more input device representations, such as a keyboard representation, a mouse representation, a trackpad representation, a numeric keypad representation, a gaming controller representation, or the like. Each PID may track the movements of a user's hands and fingers and predict the input being provided by the user's interaction with the projected input device. Each PID may send the predicted input to the computing device 500. In this way, multiple users viewing the display device 100 can collaborate on a particular project or document, play a particular game, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A display device comprising:
   an enclosure to house:
      a display panel; and
      a plurality of projection input devices attached to the enclosure, wherein:
         individual projection input devices of the plurality of projection input devices correspond to individual users of a plurality of users;
         the individual projection input devices comprise one or more cameras and one or more projectors; and
         the individual projection input devices of the plurality of projection input devices are configured to perform operations comprising:
            receiving first video data from the one or more cameras;
            determining that the first video data includes a particular gesture;
            projecting, using the one or more projectors, a representation of an input device on a work surface, wherein the representation of the input device corresponds to the particular gesture included in the first video data;
            receiving second video data from the one or more cameras;
            identifying, in the second video data, one or more fingers interacting with the representation of the input device;
            tracking a motion of the one or more fingers relative to the representation of the input device;
            predicting, using a machine learning algorithm and based on tracking the motion of the one or more fingers relative to the representation of the input device, a particular input being provided; and
            transmitting the particular input to a computing device;
   wherein the plurality of projection input devices enable the plurality of users to simultaneously provide input while viewing the display panel; and
   wherein at least one projection input device of the plurality of projection input devices is:
      stored in a retracted position in a cavity of the enclosure of the display device when not in use; and
      placed in a projection position in which at least a portion of the at least one projection input device extends past an external surface of the enclosure of the display device when in use.

2. The display device of claim 1, wherein:
   at least one projection input device of the plurality of projection input devices is permanently attached to the enclosure of a display device.

3. The display device of claim 1, wherein:
at least one projection input device of the plurality of projection input devices is temporarily attached to the enclosure of a display device by inserting a plug of the projection input device into a port located on the enclosure of the display device.

4. The display device of claim 3, wherein:
the plug comprises:
- a locking mechanism to temporarily secure the projection input device to the enclosure of the display device;
- a release mechanism to release the projection input device from the enclosure of the display device after the projection input device is secured to the enclosure of the display device;
- one or more motors to position the projection input device in three dimensions; and
- one or more electrical connections to route power from the display device to the projection input device.

5. The display device of claim 1, the operations further comprising:
- receiving additional video data from the one or more cameras;
- performing a gesture recognition analysis of a content of the additional video data;
- determining, based on the gesture recognition analysis, that the additional video data includes a pre-defined gesture; and
- performing one or more actions associated with the pre-defined gesture.

6. The display device of claim 5, wherein the one or more actions comprise at least one of:
- initiating projection of a representation of a particular input device;
- modifying an appearance of the representation of the particular input device, including modifying at least one of a brightness or a color of the representation of the particular input device;
- moving the projection of the representation from a first location to a second location; or
- stopping displaying the representation of the particular input device.

7. The display device of claim 1, wherein the representation of the at least one input device comprises a representation of one of:
- a keyboard;
- a mouse;
- a trackpad;
- a numeric keypad;
- a trackball; or
- a gaming controller.

8. A display device comprising:
an enclosure;
a display panel; and
a plurality of projection input devices attached to the enclosure, wherein individual projection input devices of the plurality of projection input devices correspond to individual users of a plurality of users and wherein individual projection input devices of the plurality of projection input devices are configured to:
- receive first video data from one or more cameras;
- determine that the first video data includes a particular gesture;
- project, using one or more projectors, a representation of an input device on a work surface, wherein the representation of the input device corresponds to the particular gesture included in the first video data;
- receive second video data from the one or more cameras;
- identify, in the second video data, one or more fingers interacting with the representation of the input device;
- track a motion of the one or more fingers relative to the representation of the input device;
- predict, using a machine learning algorithm and based on tracking the motion of the one or more fingers relative to the representation of the input device, a particular input being provided; and
- transmit the particular input to a computing device that is connected to the display device;
wherein the plurality of projection input devices enable the plurality of users to simultaneously provide input while viewing the display panel; and
wherein at least one projection input device of the plurality of projection input devices is:
- stored in a retracted position in a cavity of the enclosure of the display device when not in use; and
- placed in a projection position in which at least a portion of the at least one projection input device extends past an external surface of the enclosure of the display device when in use.

9. The display device of claim 8, wherein:
at least one projection input device of the plurality of projection input devices is permanently attached to the enclosure of a display device.

10. The display device of claim 8, wherein:
at least one projection input device of the plurality of projection input devices is temporarily attached to the enclosure of a display device by inserting a plug included in each projection input device into a port located on the enclosure of the display device.

11. The display device of claim 10, wherein the plug comprises:
- a locking mechanism to temporarily secure a particular projection input device of the plurality of projection input devices to the enclosure of the display device;
- a release mechanism to release the particular projection input device from the enclosure of the display device after the particular projection input device is secured to the enclosure of the display device;
- one or more motors to position the particular projection input device in three dimensions; and
- one or more electrical connections to route power from the display device to the particular projection input device.

12. The display device of claim 8, wherein each projection input device is further configured to:
- receive additional video data from the one or more cameras;
- perform a gesture recognition analysis of a content of the additional video data;
- determine, based on the gesture recognition analysis, that the additional video data includes a pre-defined gesture; and
- perform one or more actions associated with the pre-defined gesture.

13. The display device of claim 12, wherein the one or more actions comprise at least one of:
- initiating projection of a representation of a particular input device;
- modifying an appearance of the representation of the particular input device, including modifying at least one of a brightness or a color of the representation of the particular input device;

moving the projection of the representation from a first location to a second location; or stopping displaying the representation of the particular input device.

14. The display device of claim 8, wherein the representation of the input device comprises a representation of one of:
   a keyboard;
   a mouse;
   a trackpad;
   a numeric keypad;
   a trackball; or
   a gaming controller.

15. An all-in-one device comprising:
   an enclosure to house:
      a motherboard comprising one or more processors and one or more non-transitory computer-readable storage media;
      a display panel; and
      a plurality of projection input devices attached to the enclosure, wherein individual projection input devices of the plurality of projection input devices correspond to individual users of a plurality of users and wherein individual projection input devices of the plurality of projection input devices are configured to:
         receive first video data from one or more cameras;
         determine that the first video data includes a particular gesture;
         project, using one or more projectors, a representation of an input device on a work surface, wherein the representation of the input device corresponds to the particular gesture included in the first video data;
         receive video data from the one or more cameras;
         identify one or more fingers interacting with the representation of the input device;
         track a motion of the one or more fingers relative to the representation of the input device;
         predict, using a machine learning algorithm and based on tracking the motion of the one or more fingers relative to the representation of the input device, a particular input being provided; and
         transmit the particular input to the motherboard;
   wherein the plurality of projection input devices enable the plurality of users to simultaneously provide input while viewing the display panel; and
   wherein at least one projection input device of the plurality of projection input devices is:
      stored in a retracted position in a cavity of the enclosure when not in use; and
      placed in a projection position in which at least a portion of the at least one projection input device extends past an external surface of the enclosure when in use.

16. The all-in-one device of claim 15, wherein:
   at least one projection input device of the plurality of projection input devices is permanently attached to the enclosure of a display device.

17. The all-in-one device of claim 15, wherein:
   at least one projection input device of the plurality of projection input devices is temporarily attached to the enclosure of a display device by inserting a plug included in each projection input device into a port located on the enclosure of the display device.

18. The all-in-one device of claim 17, wherein the plug comprises:
   a locking mechanism to temporarily secure a particular projection input device of the plurality of projection input devices to the enclosure of the display device;
   a release mechanism to release the particular projection input device from the enclosure of the display device after the particular projection input device is secured to the enclosure of the display device;
   one or more motors to position the particular projection input device in three dimensions; and
   one or more electrical connections to route power from the display device to the particular projection input device.

19. The all-in-one device of claim 15, wherein each projection input device is further configured to:
   receive additional video data from the one or more cameras;
   perform a gesture recognition analysis of a content of the additional video data;
   determine, based on the gesture recognition analysis, that the additional video data includes a pre-defined gesture; and
   perform one or more actions associated with the pre-defined gesture, wherein the one or more actions comprise at least one of:
      initiating projection of a representation of a particular input device;
      modifying an appearance of the representation of the particular input device, including modifying at least one of a brightness or a color of the representation of the particular input device;
      moving the projection of the representation from a first location to a second location; or
      stopping displaying the representation of the particular input device.

20. The all-in-one device of claim 19, wherein the representation of the particular input device comprises a representation of one of:
   a keyboard;
   a mouse;
   a trackpad;
   a numeric keypad;
   a trackball; or
   a gaming controller.

* * * * *